US011556390B2

(12) United States Patent
Alvelda, VII et al.

(10) Patent No.: US 11,556,390 B2
(45) Date of Patent: Jan. 17, 2023

(54) EFFICIENT HIGH BANDWIDTH SHARED MEMORY ARCHITECTURES FOR PARALLEL MACHINE LEARNING AND AI PROCESSING OF LARGE DATA SETS AND STREAMS (71) Applicant: Brainworks Foundry, Inc., Arlington, VA (US)

(72) Inventors: Phillip Alvelda, VII, Arlington, VA (US); Markus Krause, Oakland, CA (US); Todd Allen Stiers, Great Falls, VA (US)

(73) Assignee: Brainworks Foundry, Inc., Arlington, VA (US)

( * ) Notice: Subject to any disclaimer, the term of this patent is extended or adjusted under 35 U.S.C. 154(b) by 0 days.

(21) Appl. No.: 16/591,402

(22) Filed: Oct. 2, 2019

(65) Prior Publication Data
US 2020/0104185 A1    Apr. 2, 2020

Related U.S. Application Data (60) Provisional application No. 62/739,901, filed on Oct. 2, 2018.

(51) Int. Cl.
*G06F 9/50* (2006.01)
*G06F 9/54* (2006.01)

(52) U.S. Cl.
CPC .......... *G06F 9/5066* (2013.01); *G06F 9/5083* (2013.01); *G06F 9/544* (2013.01)

(58) Field of Classification Search
CPC ....... G06F 9/5066; G06F 9/5083; G06F 9/544
See application file for complete search history.

(56) References Cited

U.S. PATENT DOCUMENTS

| 5,634,037 | A | | 5/1997 | Sasaki et al. | |
|---|---|---|---|---|---|
| 6,141,447 | A | * | 10/2000 | Linzer | H04N 19/46 375/E7.094 |
| 6,253,293 | B1 | * | 6/2001 | Rao | G10L 19/16 700/94 |
| 7,227,589 | B1 | * | 6/2007 | Yeo | H04N 19/61 348/721 |
| 2002/0019844 | A1 | | 2/2002 | Kurowski et al. | |
| 2006/0251064 | A1 | * | 11/2006 | Yeh | H04N 5/76 370/389 |
| 2007/0180261 | A1 | | 8/2007 | Akkermans et al. | |
| 2009/0067726 | A1 | | 3/2009 | Erol et al. | |
| 2009/0074259 | A1 | | 3/2009 | Baltatu et al. | |

(Continued)

FOREIGN PATENT DOCUMENTS

| JP | 4472273 B2 | 6/2010 |
|---|---|---|
| JP | 4725964 B2 | 7/2011 |

OTHER PUBLICATIONS

International Search Report and Written Opinion in International Application No. PCT/US2019/054338 dated Dec. 31, 2019.

*Primary Examiner* — Emerson C Puente
*Assistant Examiner* — Jonathan R Labud
(74) *Attorney, Agent, or Firm* — Greenberg Traurig, LLP; Chinh H. Pham; Kristopher Reichlen (57) ABSTRACT

The present disclosure relates to systems and methods to implement efficient high-bandwidth shared memory systems particularly suited for parallelizing and operating large scale machine learning and AI computing systems necessary to efficiently process high volume data sets and streams.

14 Claims, 4 Drawing Sheets

(56) References Cited

U.S. PATENT DOCUMENTS

| | | |
|---|---|---|
| 2010/0228692 A1 | 9/2010 | Guralnik et al. |
| 2010/0246679 A1* | 9/2010 | Dey .................. H04N 19/44 375/240.16 |
| 2011/0249742 A1 | 10/2011 | Price et al. |
| 2012/0229589 A1* | 9/2012 | Barrus ................ H04N 7/147 348/14.08 |
| 2013/0243329 A1 | 9/2013 | Oro et al. |
| 2015/0007243 A1* | 1/2015 | Kunkel .......... H04N 21/234327 725/116 |
| 2016/0294825 A1 | 10/2016 | Nice et al. |
| 2016/0308859 A1 | 10/2016 | Barry et al. |
| 2017/0102970 A1 | 4/2017 | Kolk et al. |
| 2018/0088956 A1* | 3/2018 | Combs ................ G06F 9/3822 |
| 2019/0182495 A1* | 6/2019 | Bruns .................. H04N 19/146 |
| 2020/0105400 A1 | 4/2020 | Alvelda et al. |

* cited by examiner

EFFICIENT HIGH BANDWIDTH SHARED MEMORY ARCHITECTURES FOR PARALLEL MACHINE LEARNING AND AI PROCESSING OF LARGE DATA SETS AND STREAMS

CROSS-REFERENCE TO RELATED APPLICATION(S)

This application claims priority to, and the benefit of, U.S. Provisional Application No. 62/739,901, filed Oct. 2, 2018 for all subject matter common to both applications. The disclosure of said provisional applications is hereby incorporated by reference in its entirety.

FIELD OF THE INVENTION

The present disclosure relates to systems and methods suitable for providing a shared memory for use by parallel processes. In particular, the present disclosure relates to systems and methods for providing a single shared memory containing large amounts of data for use my multiple processes running in parallel while maintaining a state for each process.

BACKGROUND

Generally, most current machine learning systems are hand-tuned special purpose systems designed to solve very specific and narrow problems. But newly emerging application areas for AI tools demand a more flexible system architecture that can support a growing number of parallel processing tasks that must be applied to incoming data streams in real time, and to process very large data sets efficiently.

SUMMARY

There is a need for improvements for providing flexible memory storage for use by advanced processes such as processes related to artificial intelligence, machine learning, etc. The present disclosure provides, in various embodiments solutions to address this need, in addition to having other desirable characteristics. Specifically, the present disclosure provides systems and methods that provide a single shared memory for use by multiple devices for both accessing and storing data.

In accordance with example embodiments of the present invention, a method for implementing parallel processing with shared memory is provided. The method includes receiving, by at least one processor, a data stream object produced by one or more remote user devices including at least one digital image capture device, saving each data stream object, by the at least one processor, as a sequence of individual elements into the shared memory, accessing, by the at least one processor, a sequence of individual elements within the shared memory for at least one processing task of a plurality of independent parallel processing tasks, performing, by the at least one processor, the at least one processing task using the sequence of individual elements in the shared memory, and saving, by the at least one computing device, results of the at least one processing task into the shared memory.

In accordance with aspects of the present invention, the data stream object includes at least one of a plurality of images, a video stream, and a sound stream. The data stream object can include meta data describing process steps to be applied to the data stream object. The method can further includes analyzing, by the at least one processor, incoming data stream objects for validity. The method can further includes applying, by the at least one processor, security measures to the incoming data stream objects. The method can further includes analyzing, by the at least one processor, meta data describing process steps to be applied to the data stream object and preparing a sequence of algorithms to be run on each of the individual elements. The method can further includes executing, by the at least one computing device, the process steps on the each of the individual elements using the sequence of algorithms. The method can further includes generating, by the at least one computing device, a report based on a current state of the shared memory. The method can further include balancing, by the at least one processor, a plurality of independent processing pipelines across the cluster of computing devices of using a predictive load balancer.

In accordance with example embodiments of the present invention, a system for implementing parallel processing with shared memory is provided. The system includes a shared memory providing read and write access to one or more remote user devices and one or more computing devices. The one or more remote user devices are configured to receive a data stream object produced by at least one digital image capture device and save each data stream object as a sequence of individual elements into the shared memory. The one or more computing devices are configured to read the shared memory to access the sequence of individual elements, perform at least one processing task from a plurality of independent parallel processing tasks using the sequence of individual elements in the shared memory, and save results of each of the at least one processing task into the shared memory.

In accordance with aspects of the invention, the data stream object includes at least one of a plurality of images, a video stream, and a sound stream. The data stream object can include meta data describing process steps to be applied to the data stream object. The one or more computing devices can analyze incoming data stream objects for validity. The one or more computing devices can apply security measures to the incoming data stream objects. The one or more computing can analyze meta data describing process steps to be applied to the data stream object and preparing a sequence of algorithms to be run on each of the individual elements. The one or more computing devices can execute the process steps on the each of the individual elements using the sequence of algorithms. The one or more computing devices can generate a report based on a current state of the shared memory. The one or more computing devices can balance a plurality of independent processing pipelines across the cluster of computing devices of using a predictive load balancer.

BRIEF DESCRIPTION OF THE FIGURES

These and other characteristics of the present disclosure will be more fully understood by reference to the following detailed description in conjunction with the attached drawings, in which.

DETAILED DESCRIPTION

An illustrative embodiment of the present disclosure relates to systems and methods for implementing methods and systems that can dynamically attach and detach processing tasks to operate in parallel in a single large shared memory buffer.

The problem addressed by the methods and systems of the present disclosure, is that instead of aggregating and processing information in a central cloud server system and distributing the results across the edge to a multiplicity of client devices, there is an optimized architecture that can handle the reverse mirror image of that primary data flow. This enables the present disclosure to collect massive amounts of live streaming data from a multiplicity of remote networked clients, for example, by streaming it live to a centralized server system. With data streams arriving from remote clients at the central server system, massive parallel processing systems can be applied to the streams on the fly using the latest computationally expensive AI-enhanced analysis techniques at scale and work to store and analyze increasingly large databases. Even what might otherwise seem like a simple reversal of the data flow introduces different scaling and response challenges. For example, in contrast to stateless web servers, a wide range of streaming sessions require maintaining some aspect of state in an ongoing session for a specific user of that session or connection while their data streams to the server. An example implementation is the user of remote biometric sensors which stream live patient data back to a central analysis and data repository system, for example, as discussed with respect to U.S. application Ser. No. 16/590,000, incorporated herein by reference. Different data types can be stored and accesses by the parallel processes. Data types can include, but are not limited to, video, audio, electronic, and other types of digital data.

FIGS. 1 through 4, wherein like parts are designated by like reference numerals throughout, illustrate an example embodiment or embodiments of improved operation for using shared memory when performing data analysis, according to the present disclosure. Although the present disclosure will be described with reference to the example embodiment or embodiments illustrated in the figures, it should be understood that many alternative forms can embody the present disclosure. One of skill in the art will additionally appreciate different ways to alter the parameters of the embodiment(s) disclosed, such as the size, shape, or type of elements or materials, in a manner still in keeping with the spirit and scope of the present disclosure.

Figure 1:
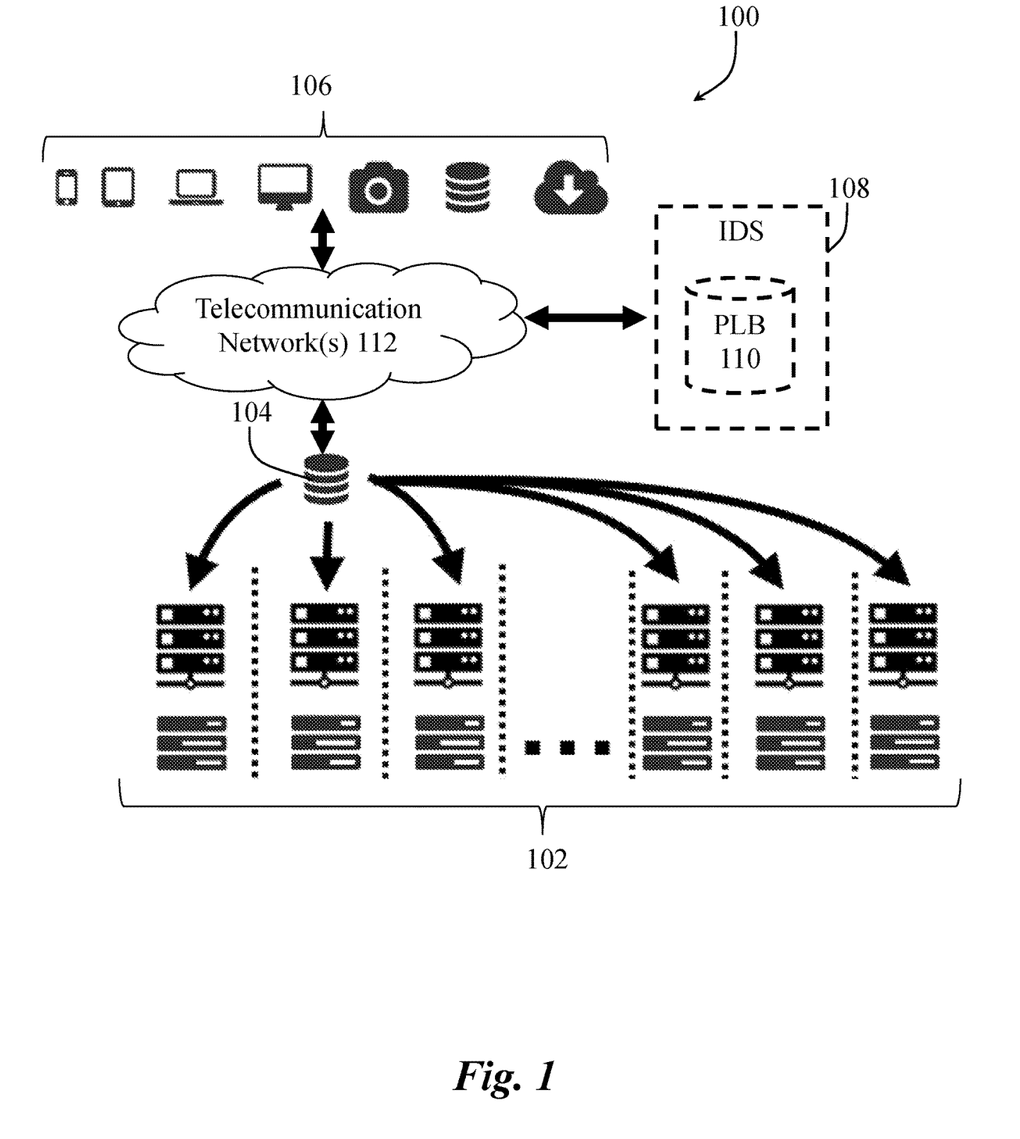
FIG. 1 is a diagrammatic illustration of a system for implementation of the methods in accordance with the present disclosure.

Referring to FIG. 1, an example data streaming system 100 for implementing the present disclosure is depicted. Specifically, FIG. 1 depicts an illustrative system 100 for streaming data from a plurality of client devices (user devices 106) to a cluster of computing devices (computing devices 102) that utilize a shared memory to perform analysis on the received data. In some embodiments, the system 100 can be a combination of hardware and software configured to carry out aspects of the present disclosure. For example, the system 100 can include a complex distributed client server architecture. In some embodiments, the system 100 can include a combination of computing devices 102. The computing devices 102 can be work servers. with specialized software and databases designed for providing a method for monitoring and tracking biometric data using image data. For example, the system 100 can implemented software installed on a computing device 102, a web based application provided by a computing device 102 which is accessible by computing devices (e.g., user devices 106), a cloud based application accessible by computing devices, or the like.

In some embodiments, the system 100 can include a cluster of computing devices 102 or work servers designed to operate in parallel to perform analysis on data stored within a shared memory 120. As would be appreciated by one skilled in the art, the computing devices 102 can include a single computing device, a collection of computing devices in a network computing system, a cloud computing infrastructure, or a combination thereof. The combination of hardware and software that make up the system 100 are specifically configured to provide a technical solution to a particular problem utilizing an unconventional combination of steps/operations to carry out aspects of the present disclosure. In particular, the system 100 is designed to execute a unique combination of steps to provide a novel approach to providing shared memory for use by multiple parallel analysis processes.

The implementation of shared memory 120 for multiple processes is a critical functional capability for large scale machine learning and AI services, where many typical tasks involve either large amounts of data to be processed, and/or lots of compute processing to be applied to data sets. Many of the computing tasks require more processing power than is typically mounted in one machine in order the achieve real-time performance on complex machine learning and AI tasks. One alternative is to pass data through a series of pipelined computer steps, but there is substantial latency in moving the large data blocks through network interfaces across multiple machines. Shared memory access, where multiple threads and processes can operate on single common memory and disk repositories offers substantial computational improvements for AI processes and other similar processes. The architectural challenge that this invention solves, is the coordination of multiple AI and machine learning processes operating in parallel on a single shared memory so as not to move data unnecessarily, while applying multiple parallel threads and processes while minimizing locks and blocks which delay throughput on the processing chain. In other words, separate devices individually performing processing tasks can use the single shared memory 120 in addition to using their own dedicated memory space to perform the processing tasks.

In some embodiments, the system 100 can include a storage system 104 communicatively attached to the computing device(s) 102. The storage system 104 can include any combination of computing devices configured to store and organize a collection of data. For example, storage system 104 can be a local storage device on the computing device 102, a remote database facility, or a cloud computing storage environment. The storage system 104 can also include a database management system utilizing a given database model configured to interact with a user for analyzing the database data.

In some embodiments, the system 100 can include a plurality of user devices 106. The plurality of user devices 106 can be any combination of internet capable computing device(s) 102 capable of being able to communicate with the computing device(s) 102 and/or the storage system 104. For example, the user devices 106 can be part of and/or connected to any ICD device that can establish a connection to another device over a communication medium using connection methods, including but are not limited to, protocols such as HyperText Transfer Protocol (HTTP)/HyperText Transfer Protocol Secure (HTTPS), Transmission Control Protocol (TCP)/User Datagram Protocol (UDP), etc. Using the connection, the computing device(s) 102 and/or the storage system 104 can act as a host (centralized or distributed), for the user devices 106, providing the functionality of the present disclosure.

In some embodiments, user devices 106 can include a camera or other image capturing device. The camera can include any combination of devices that can record image data and/or allows transfer of image data to an internet capable device (ICD). For example, examples of cameras can include mobile phone cameras, closed-circuit television (CCTV) systems, cameras integrated in laptops tablets, personal computers, photo and video cameras, external webcams, digital camcorder, wrist watches, game consoles, smart home appliances, including smart televisions and refrigerators, cars, smart glasses, eBook readers, etc. The transfer of image data to the computing device(s) 102 can include any method suitable including but not limited to direct streaming over a wireless or hard-wired connection as well as using a storage device such as a hard drive or a memory card or cloud storage.

In some embodiments, the user devices 106 directly or indirectly provide image data, image streams, and/or other data to the computer devices 102. For example, the user devices 106 may include a digital camera or a digital imaging device in the possession of any party, which may upload imagery to, e.g., a storage platform such as a cloud service for provision to the computer devices 102 and storage system 104. Although examples using cameras capturing image data are provided herein, the user devices 106 can include and use any combination of data acquisition devices capturing any combination of data without departing from the scope of the present disclosure.

In some embodiments, the system 100 can include an interface delivery server (IDS) 108. The IDS 108 can be designed to facilitate a connection between a user device 106 and a computing device 102. In some embodiments, the IDS 108 includes a predictive load balancer (PLB) 110 that determines the most suitable computing device 102 within a cluster of computing devices 102. In one example, the PLB 110 can determine the most suitable computing devices 102 by tracking recent data deliveries and maintaining a session state for different client devices, so that data from the same client is regularly forwarded to the same computing devices 102 in a work server cluster. This serves to limit the repeated central shared memory access requirements. The ICD can generate an interface (e.g., webpage, app, etc.) that directly connects the user devices 106 to the computing device(s) 102 determined to be most suitable by the PLB 110. This configuration may be used for establishing connections between clients and servers. For example, the user devices 106 can be client devices, the computing devices 102 can be work servers, and the IDS 108 can handle negotiations to connect the client devices (user devices 106) with the work servers (computing devices 102).

In some embodiments, the computing devices 102, 104, 106, 120 can be configured to establish a connection and communicate over the telecommunication network(s) 110 to carry out aspects of the present disclosure. The telecommunication network(s) 110 can include any combination of known networks. For example, the telecommunication network(s) 110 may be any combination of a mobile network, WAN, LAN, or other type of network. The telecommunication network(s) 110 can be used to exchange data between the computing devices 102, 104, 106, 108 exchange data with the storage system 104, and/or to collect data from additional sources.

In operation, the system 100 of the present disclosure can be designed to create a system for efficient parallel processing of data streams. This technical improvement can be realized by implementing a unique combination of processing stages, enhanced with new brain-inspired AI algorithms, acting in concert to process data streams provided through a shared memory 120 resource. The shared memory 120 resource can be located on a dedicated storage system (e.g. storage system 104) or on one of the computing devices 102. Different embodiments across devices with different processing and networking capabilities can have different optimal combinations of local versus remote memory and computing power relative to available network bandwidth. Devices and systems with higher performing networks can network independent memory stores and computing resources more effectively where network constrained environments, and or applications with data-volume intensive tasks that stress interconnection networks and busses with too much traffic and latency will benefit most from the shared memory approach of the present disclosure.

Figure 2:
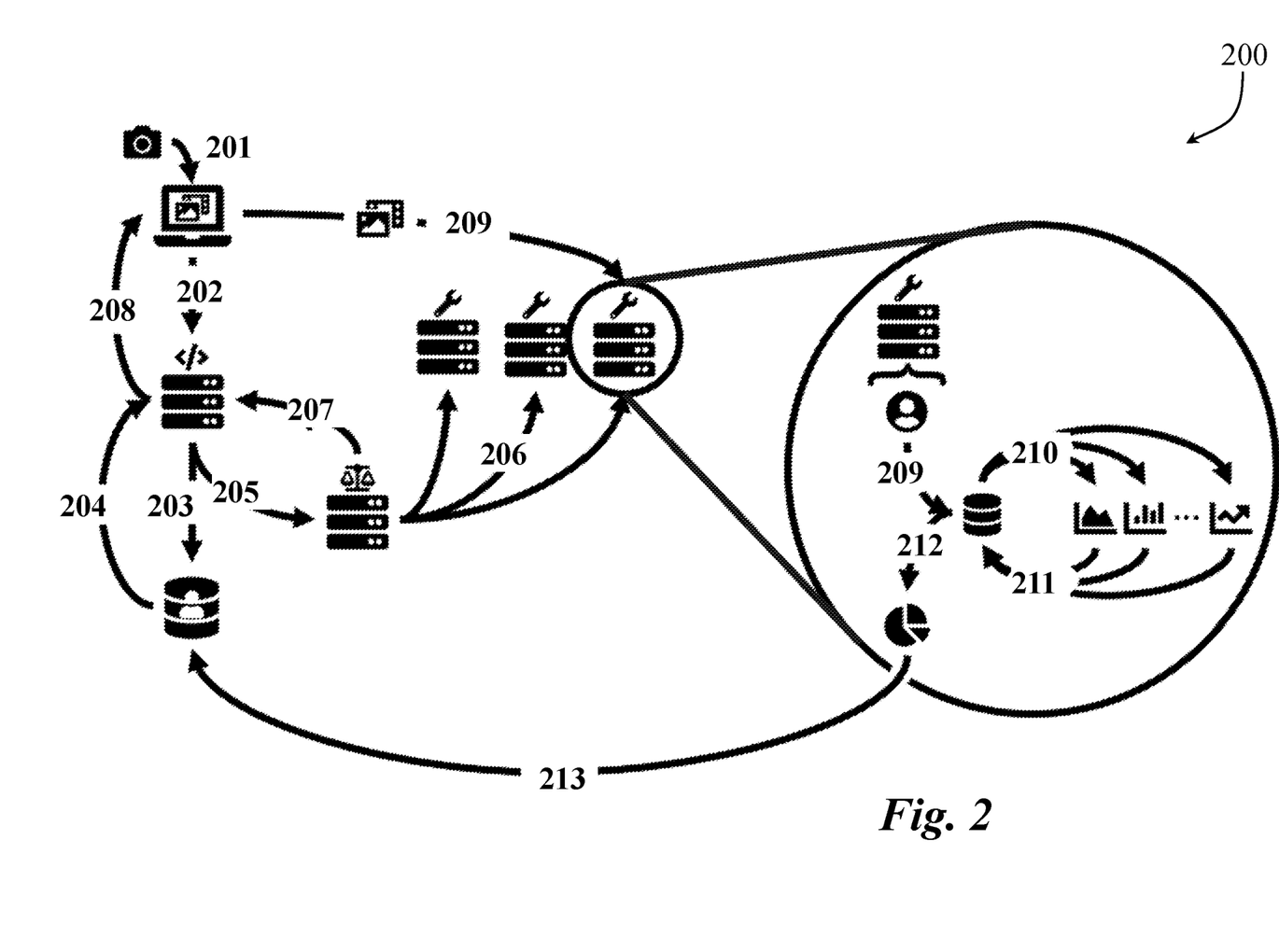
FIG. 2 is a diagram depicting a process of performing parallel analysis processes in accordance with the present disclosure.

Referring to FIG. 2 an example process 200 for implementing the present disclosure is provided. FIG. 2 depicts the process 200 for transforming image data captured from cameras connected to user devices 106 to analytics data. The process 200 can be used to derive analytics data from the image data. For examples, the process 200 can be used to perform analysis on complex biometric data, for example, as discussed with respect to U.S. application Ser. No. 16/590,000, incorporated herein by reference. Although the process 200 is discussed with respect to the use of image data, any combination of aggregated data could be used without departing from the scope of the present disclosure.

At step 201 image data received from the cameras can be transferred to the user devices 106. The transfer from the camera to the user devices 106 can include any type of data transfer, for example, wireless, external wiring, internal wiring, etc. Similarly, any combination of cameras can be connected to or otherwise part of the user devices 106 can provide the image data to the user devices 106. For example, the user devices 106 can be a smartphone with an embedded camera designed to capture images and video for storage on the local storage of the smartphone. The user devices 106 can store the image data locally and/or remotely, for example in local memory and cloud storage.

At step 202 the user devices 106 can request an interface from an interface delivery server (IDS) 108 to establish a connection with one or more computing devices 102 and/or the shared memory 120 to perform analysis of the image data. The interface can take multiple forms including but not limited to an HTML based website or precompiled code executable in an app on the user devices 106.

At step 203 The IDS 108 can connect to a storage system 104 maintaining a user database associated with the present disclosure. For example, the IDS 108 can connect to a central repository that includes a user database that maintains user account settings and records. Thereafter, the IDS 108 can request relevant user information from the user database to ensure secure login by the credentials provided by the user devices 106.

At step 204, in response to receiving the request from the IDS 108, the storage system 104 can provide the appropriate user data to the IDS 108. After the IDS 108 retrieves the user data, it can generate a secure token to in an authentication process with one or more computing devices 102. In this example the computing devices 102 can be worker servers operating as part of a server cluster, as shown in FIGS. 1 and 2. The computing devices 102 acting as work serves can provide the functionality to transform the recorded images, chunks, or video streams called Frame Data (FD) into analytics data.

At step 205 the IDS 108 can request information about which/how many computing devices 102 are available within the server cluster from the PLB 110. In some embodiments, the PLB 110 can maintain a prioritized queue of records as what computing devices 102 are available by relative load, and which user devices 106 have submitted data records to which computing devices 102 that might have all necessary data for that user already in memory, in order to select the optimal match.

At step 206 The PLB 110 can predict future workload on the cluster of computing devices 102. Based on the future workload, the PLB 110 can determine the most suitable computing device 102 within the cluster for processing the image data (e.g., process 200 of FIG. 2) from the user devices 106. In some embodiments, the PLB 110 can predict the future workload by analyzing historical log records of specific user access patterns (e.g., from the participant records) and timing to determine the most suitable computing device 102 that can most efficiently address that user and the user devices 106 processing needs with minimum network and shared memory load.

At step 207 the PLB returns required details for providing an interface for communicating with the most suitable computing device 102 to perform the analysis. At step 208 the IDS 108 compiles the interface based on the received required details for the computing device 102 and the user information and returns the interface to the appropriate user device 106. The user device 106 can then use the received interface to directly connects to the allocated computing device 102, for example, as part of a client-server relationship.

At step 209 The user device 106 device uses the generated interface to transfer the Frame Data (e.g., image data) to the computing device 102 and/or the shared memory 120 for processing. The user devices 106 can transmit either each recorded image individually in an intermittent stream, or streams of a subset of the recorded images as a stream of chunks of video—either as raw or uncompressed data in any suitable form of encoding (e.g., as a video or stream of individual pictures, or subset regions of interest clipped from whole video, or the complete video stream) to the computing device 102 over the established secure connection created by the interface.

At step 210 the computing device 102 can prepare the frame data into individual frames and process each frame processed individually in parallel pipelines and blocking free, such as, heart rate, respiration, blood pressure, temperature, pain, tremors, etc.

At step 211 each process in this chain can be a preprocessing step. All processes can be independent and can be run in parallel by a single selected computing device 102, virtual machines created by the selected computing device 102, or a combination of computing devices 102. Processes performed by the pipelines can include image stream preparation and session initiation, face detection and location, face recognition, authentication and access control, face masking, video telemetry and relay to the central processing servers, video signal conditioning and de-trending, and noise removal, vital sign and biometric signal extraction and analysis, vital sign signal processing, measurement quality assessment, data storage, security, and persistence/archiving.

In some embodiments, inter-process communication is ensured through the shared memory 120 system. At step 212 each process shares results through the shared memory 120. In some embodiments, the shared memory 120 can be stored on a single computing device 102 where all the processing pipeline threads and processes operate within or on a single machine memory mounted in a larger computer cluster with a high-bandwidth network bus to access the single scaled shared memory by all computing devices 102 within a cluster. In some embodiments, a single shared memory can be partitioned across multiple computing devices 102 within a cluster where portions of the larger database are stored in each computing device 102. In some embodiments, only the authenticated computing devices 102 in the single processing cluster can access the shared memory associated with that cluster. The processes running on the computing devices 102 with that cluster can use all the image information in the shared memory including any results or data from the other processes that operate on the shared data and subsequently store results in the shared memory.

Each pipeline module and stage can operate directly in shared memory 120 in a networked architecture where any pipeline module can be located anywhere between the user device 106 client and the computing devices 102, or completely co-located on a single remote or centrally located cloud device.

At step 213 a wrap up process runs once the individual processes have finished their work and can take all the results stored in shared memory 120 and persist the results in the within the storage system 104 (e.g. cloud storage, local hard drive, etc.). Depending on the type of information being stored, the data can be deidentified, encrypted, etc. to be in compliance with the appropriate regulations, for example, HIPAA and GDPR. In some embodiments, the wrap up process can include creating reports providing detailed results of the analyses performed by the computing devices 102. The process steps can be implemented for different applications, such as for example, providing biometric monitoring of patients using image data, as discussed with respect to U.S. application Ser. No. 16/590,000, incorporated herein by reference.

Figure 3:
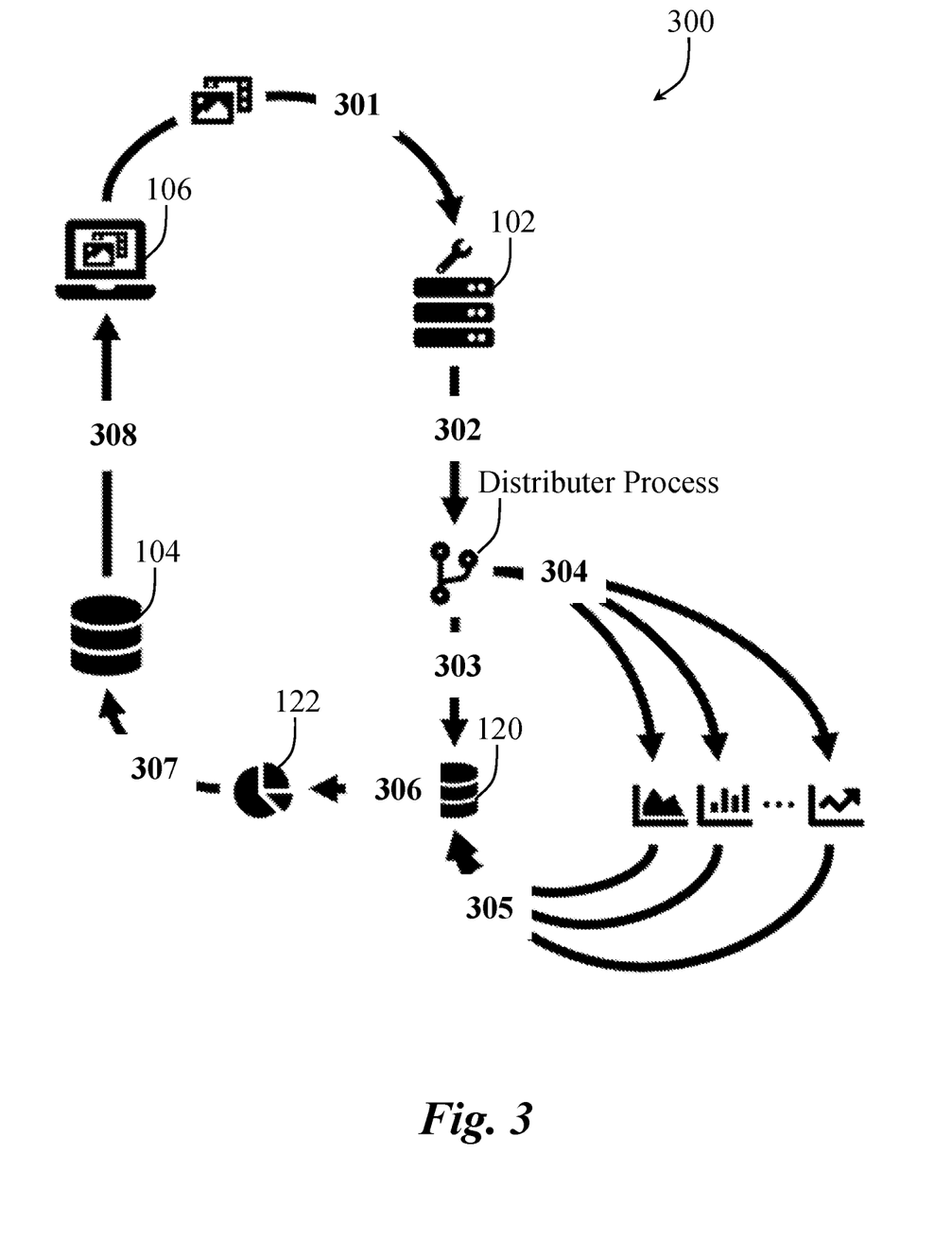
FIG. 3 is a diagram depicting a process of parallel processes using shared memory in accordance with the present disclosure.
Figure 4:
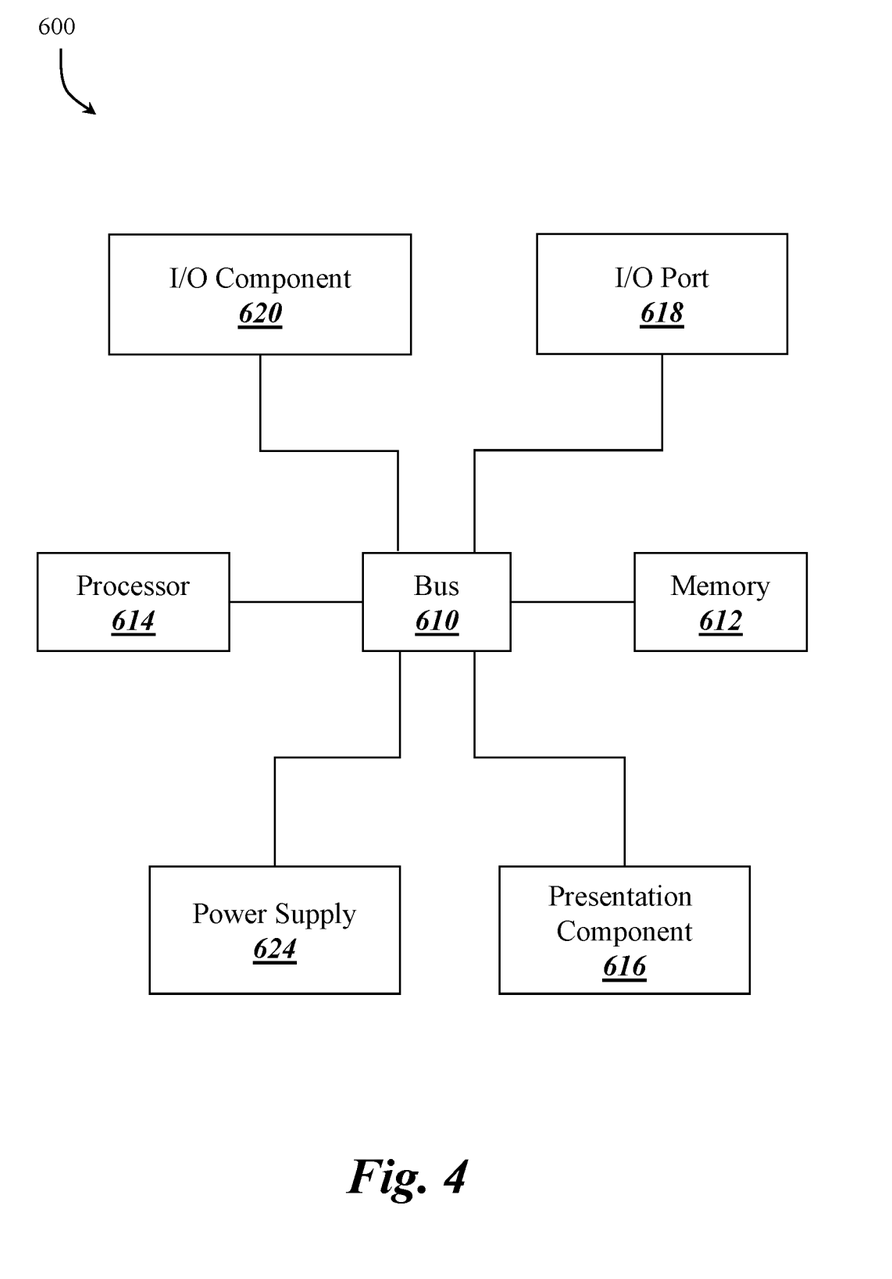
FIG. 4 is a diagrammatic illustration of a high-level architecture for implementing processes in accordance with the present disclosure.

Referring to FIG. 3, a process 300 for providing a shared memory buffer 120 to receive and store data from multiple remote sources for use by multiple processing tasks operating in parallel, for example, as discussed with respect to FIG. 2. In other words, the process 300 can receive streams of data from multiple clients for execution through multiple processing tasks from within a single shared memory buffer. In other words, the shared memory 120 can be used to both store data streams from multiple user devices 106, provide access of those data streams for analysis by multiple computing devices 102, and store the results of said analysis.

The technical advantage of this architecture is that an arbitrary number of either remote (via a network interface) or local (running on the same machine as the shared memory 120) processes and threads can operate in parallel on the same shared memory to efficiently execute machine learning and AI type training algorithms in a coordinated pipeline process to generate results from large data sets as they stream by in real time. Pipelining the processes to operate in a parallel sequence on the stationary shared memory 120 improves efficiency over traditional architectures which move data through different stationary processors, while minimizing network utilization. In one embodiment, each specific process, thread or device can be spawned with pre-defined code modules with pre-assigned working space, and timing limits with respect to neighboring process steps and threads that expect to operate on the same areas of shared memory. Thus, minimal overlap and blocking can be guaranteed from compile time.

For example, in some embodiments, the shared memory 120 architecture can provide two modes of operation, for example a streaming data mode and a state data mode. In the streaming data mode, data can be added to a queue (e.g. images of a video stream) such that each process that works on the image has read access to the stream data. After the process is done it can sign off on a ledger. A purge process can be alerted every time a process signs of on a stream object. After all processes have signed off, the purge process can remove the stream and associated meta data so that only the ledger entry about the work remains, to prevent memory leaks. While working on streaming data mode, many processes can generate new data. Sometimes it may not be necessary to keep a history of these results, such that a process can store data in a state variable that is updated by the process or its siblings. A sibling is a process that is performing the same task as another process in parallel (e.g., two processes running face detection are called siblings). In some embodiments, all siblings can update the same state data object. For example, a face detection algorithm can take two seconds to perform the detection, but the state needs to update faster. It is possible to start two processes, for example, one process acting on all odd and the other process acting on all even image frames. In some embodiments, a frame can be added to the stream and a task for face detection can be added to a queue used for all face detection siblings. An event would be sent to all siblings subscribed to this queue. The first sibling to respond would mark the task as in progress. All other siblings would wait for another task to appear. Once the process is done it writes results to a state variable and alerts the purge process to remove the frame data from the stream.

At step 301 one or more user devices 106 transfer a data stream object to the computing device 102 for processing. In some embodiments, the stream object contains a stream of data objects, such as, images, video streams, or sound streams. The stream object can include additional information for use by the processing. For example, the stream objects can include meta data that describe the process steps and dependencies to be applied during processing of the stream object.

At step 302 a distributor process, which can run on a control server or a co-located with a worker server process within the computing device 102, analyzes all incoming stream objects received from the one or more user devices 106. The distributor ensures data validity, for example, ensuring that the received stream objects are valid to be processed. In one embodiment, the validity can be confirmed through coordination with a control server that monitors subject identification through means such as facial recognition, checks their identity versus consenting patient databases, and applies necessary security measures such as stream, data storage, and socket encryption, and access control mechanisms in order to comply with HIPAA and GDPR requirements.

At step 303, as part of the distributor process, the computing device 102 saves each analyzed stream as a sequence of individual elements to a shared memory 120. The sequence of individual elements can reside either within a single machine hosting multiple processes and threads that operate on a single shared memory 120, or on a remote machine accessible through a shared memory bus interface through a network abstraction layer. For example, a video stream can be transformed into a sequence of images stored in the shared memory 120.

At step 304 the computing device 102 analyses meta data from the stream objects and prepares a sequence of algorithms to be run on each element. In some embodiments, the meta data for each data element can be packaged within each element wherever it is stored. In some embodiments, computing device 102 can prepare a sequence of algorithms to run a succession of image processing and noise filtering algorithms followed by pattern recognition and prediction algorithms that successively refine a data set, such as vital sign measurement from facial and whole-body data streams. In some embodiments, the sequence of algorithms can include a plurality of parallel processes that perform a unique type of analysis on the image sequences, for example, as discussed with respect to U.S. application Ser. No. 16/590,000, incorporated herein by reference.

In one example implementation, for one of the parallel processes each image from the sequence of images provided in step 303 can be processed by extracting meta data from the image, for example, the location of faces in the image. The location of faces derived from either meta data provided by another process or from a separate analysis step computed either locally or remotely. The location data is a necessary component of metadata provided by a control server managing the local computing device 102 cluster as operation on the central shared memory.

At step 305 all processes, being executed by the computing devices 102, write their results back into the shared memory 120 (including such elements of state as all current data, process execution stage complete, incomplete processes, pending processes and process steps, register and CPU state, buffer states, etc.). All processes can work in parallel and update the state of the shared memory 120 independently. In some embodiments, the shared data is protected from being overwritten by careful design of the multiple pipeline process stages as related to neural computation style machine learning and AI type computing loads, so that successive pipeline stages have no prior data dependency from other stages, and have their own bounded sandbox write areas. In that sense, the modular compilation of threads and processes to operate on a single shared memory 120 are designed in conjunction so as to not lock or bind. As a result, any process can read anything, but local processes can only write in certain areas of the shared memory 120 that all other processes do not need for their independent function. This functionality requires a loose coupling between processes in tracking execution and process completion time semaphores rather than more complex locking and blocking management systems, and allows for a flexibility in time. For example, continuing the above example, as the location deriving process has access to the shared memory 120 it can save a bounding box results to the shared memory 120 for other processes to pick up on. A second process might use this data to then recognize and identify the faces in the bounding box.

In some embodiments, a control server can keep a task and priority queue of all the processing steps necessary to define a specific processing pipeline, along with process and module data dependency tables that chart which process is dependent on with partitioned data. Writes only modular code, and coordinates the dispatch of processes across computing devices 102 to maximize the process pipeline efficiency. For example, a control server can assign one process to access incoming video stream data and begin its machine learning task to extract vital signs from face video. Then, while the processor intensive task for facial video processing is ongoing, another process can be dispatched to analyze a different part of the video data, for example, the head and shoulder motions to detect respiration rates. At no time is there any process dependency between threads other than for the shared initial access to the shared memory 120 and writes back into shared memory 120 where there are no further dependencies.

At step 306 another process uses the current state of the shared memory 120 (including such elements of state as all current data, process execution stage complete, incomplete processes, pending processes and process steps, register and CPU state, buffer states, etc.) to prepare a report 122. The report 122 can be a data object that combines the current state of the shared memory 120 to provide a snapshot of the system. For example, the current state of the shared memory 120 can include such elements of state as all current data, process execution stage complete, incomplete processes, pending processes and process steps, register and CPU state, buffer states, etc. In some embodiments, the reporting process can run continuously and create a report 122 periodically. At step 307 a reporting process periodically pushes the reports 122 to the storage system 104 for archival. At step 308 a user can query storage system 104 for the current report 122 or a history of reports.

Using the processes 200 and 300 discussed with respect to FIGS. 2 and 3, receptively, the system 100 can be used to leverage a shared memory 120 to perform various types of data monitoring and analytics across a broad range of AI and/or machine learning applications types using data captured from remote user devices 106. For example, the monitoring and analytics can be provided for autonomous car navigation, Smart City Energy and Transportation management which uses many AI processing pipelines to prepare video and LIDAR and SONAR data streams. The data from any of the example implementation can be analyzed to detect objects, can analyze the object motion data to estimate trajectories, and can synthesize data from different sensors. The user devices 106 can be used to track any combination of data such as for example, biometrics for heart rate, heart rate variability, respiration rate, and blood pressure, but wide range of biometric measurements are possible using the same core architecture including facial expressions, pain levels, movement disorders, drug efficacy, attention disorders, wakefulness, jaundice detection, etc.

In another example, the use of shared memory 120, in combination with parallel processing by computing device (s) 120 using the shared memory 120, provides a way for physicians to track and monitor patient's biometrics passively, removably, and without the need to connect sensors to the patients using any cameras that may be near a patient (e.g., participant). The present disclosure can also be used to perform fully or semi-automated diagnosing of a patient from simple video, for example, an auto-doctor that can check a patient out through whatever screen and camera a patient might be in front of patient. In such implementations, consenting patients need only wander into the field of view of an ambient biometric sensor, and with no attention at all and no attending nurses or physicians, their vital signs are automatically measured and recorded to their health records.

Additional application examples which would benefit from this invention include any machine learning or AI task that is in some capacity compute bound, and/or sensitive to real time response, such as for example, autonomous vehicle and robot navigation and control, automated cybersecurity defense systems, physical security systems to monitor and control site specific personnel access, distributed energy generation management, automated personalized education systems, financial transaction and trade execution, and real-time fraud prevention.

Any suitable computing device can be used to implement the computing devices 102, 104, 106, 108, 120 and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 600 is depicted in FIG. 6. The computing device 600 is merely an illustrative example of a suitable computing environment and in no way limits the scope of the present disclosure. A "computing device," as represented by FIG. 6, can include a "workstation," a "server," a "laptop," a "desktop," a "hand-held device," a "mobile device," a "tablet computer," or other computing devices, as would be understood by those of skill in the art. Given that the computing device 600 is depicted for illustrative purposes, embodiments of the present disclosure may utilize any number of computing devices 600 in any number of different ways to implement a single embodiment of the present disclosure. Accordingly, embodiments of the present disclosure are not limited to a single computing device 600, as would be appreciated by one with skill in the art, nor are they limited to a single type of implementation or configuration of the example computing device 600.

The computing device 600 can include a bus 610 that can be coupled to one or more of the following illustrative components, directly or indirectly: a memory 612, one or more processors 614, one or more presentation components 616, input/output ports 618, input/output components 620, and a power supply 624. One of skill in the art will appreciate that the bus 610 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 6 is merely illustrative of an exemplary computing device that can be used to implement one or more embodiments of the present disclosure, and in no way limits the invention.

The computing device 600 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 600.

The memory 612 can include computer-storage media in the form of volatile and/or nonvolatile memory. The memory 612 may be removable, non-removable, or any combination thereof. Exemplary hardware devices are devices such as hard drives, solid-state memory, optical-disc drives, and the like. The computing device 600 can include one or more processors that read data from components such as the memory 612, the various I/O components 616, etc. Presentation component(s) 616 present data indications to a user or other device. Exemplary presentation components include a display device, speaker, printing component, vibrating component, etc.

The I/O ports 618 can enable the computing device 600 to be logically coupled to other devices, such as I/O components 620. Some of the I/O components 620 can be built into the computing device 600. Examples of such I/O components 620 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion may be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present disclosure be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method for implementing parallel processing with shared memory comprising:
    receiving, by at least one processor, a data stream object produced by one or more remote user devices including at least one digital image capture device;
    analyzing, by the at least one processor, the data stream object for validity;
    applying, by the at least one processor, security measures to the data stream object; saving the data stream object, by the at least one processor, as a sequence of individual elements into the shared memory;
    analyzing, by the at least one processor, meta data describing process steps to be applied to the data stream object and preparing a sequence of algorithms to be run on each of the individual elements; and
    performing, by the at least one processor, each independent parallel processing task of a plurality of independent parallel processing tasks concurrently and independently using each individual data element of the sequence of individual elements in the shared memory.

2. The method of claim 1, wherein the data stream object comprises at least one of a plurality of images, a video stream, and a sound stream.

3. The method of claim 1, wherein the data stream object comprises meta data describing process steps to be applied to the data stream object.

4. The method of claim 1, further comprising executing, by the at least one computing device, the process steps on the each of the individual elements using the sequence of algorithms.

5. The method of claim 1, further comprising generating, by the at least one computing device, a report based on a current state of the shared memory.

6. The method of claim 1, further comprising balancing, by the at least one processor, a plurality of independent processing pipelines across the cluster of computing devices of using a predictive load balancer.

7. A system for implementing parallel processing with shared memory comprising:
    a shared memory providing read and write access to one or more remote user devices and one or more computing devices;
    the one or more remote user devices configured to:
        receive a data stream object produced by at least one digital image capture device; and
        save the data stream object as a sequence of individual elements into the shared memory; and
    the one or more computing devices configured to:
        read the shared memory to access each individual data element of the sequence of individual elements concurrently and independently by a plurality of independent parallel processing tasks;
        analyze the data stream object for validity;
        apply security measures to the data stream object
        analyze meta data describing process steps to be applied to the data stream object and preparing a sequence of algorithms to be run on each of the individual elements; and
        perform each processing task from the plurality of independent parallel processing tasks concurrently and independently using each individual data element of the sequence of individual elements in the shared memory.

8. The system of claim 7, wherein the data stream object comprises at least one of a plurality of images, a video stream, and a sound stream.

9. The system of claim 7, wherein the data stream object comprises meta data describing process steps to be applied to the data stream object.

10. The system of claim 7, wherein the one or more computing devices executes the process steps on the each of the individual elements using the sequence of algorithms.

11. The system of claim 7, wherein the one or more computing devices generates a report based on a current state of the shared memory.

12. The system of claim 7, wherein the one or more computing devices balances a plurality of independent processing pipelines across the cluster of computing devices of using a predictive load balancer.

13. A method for implementing parallel processing with shared memory comprising:
    receiving, by at least one processor, a data stream object produced by one or more remote user devices including at least one digital image capture device;
    saving each data stream object, by the at least one processor, as a sequence of individual elements into the shared memory;
    analyzing, by the at least one processor, incoming data stream objects for validity;
    applying, by the at least one processor, security measures to the incoming data stream objects;
    analyzing, by the at least one processor, meta data describing process steps to be applied to the data stream object and preparing a sequence of algorithms to be run on each of the individual elements;
    accessing, by the at least one processor, the sequence of individual elements within the shared memory for at least one processing task of a plurality of independent parallel processing tasks;
    performing, by the at least one processor, the at least one processing task using the sequence of individual elements in the shared memory; and
    saving, by the at least one computing device, results of the at least one processing task into the shared memory.

14. A system for implementing parallel processing with shared memory comprising:
    a shared memory providing read and write access to one or more remote user devices and one or more computing devices;
    the one or more remote user devices configured to:
    receive a data stream object produced by one or more remote user devices including at least one digital image capture device;
    save each data stream object as a sequence of individual elements into the shared memory;
    analyze incoming data stream objects for validity;
    apply security measures to the incoming data stream objects;
    analyze meta data describing process steps to be applied to the data stream object and preparing a sequence of algorithms to be run on each of the individual elements;
    access the sequence of individual elements within the shared memory for at least one processing task of a plurality of independent parallel processing tasks;
    perform the at least one processing task using the sequence of individual elements in the shared memory; and
    save results of the at least one processing task into the shared memory.

* * * * *